Jan. 11, 1938.     C. B. SAWYER     2,105,010
PIEZOELECTRIC DEVICE
Filed Feb. 25, 1933     2 Sheets-Sheet 1
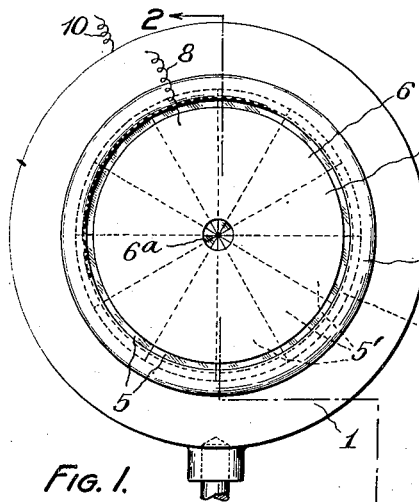
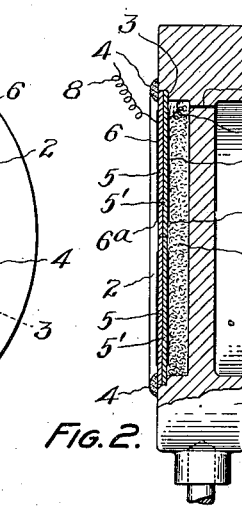
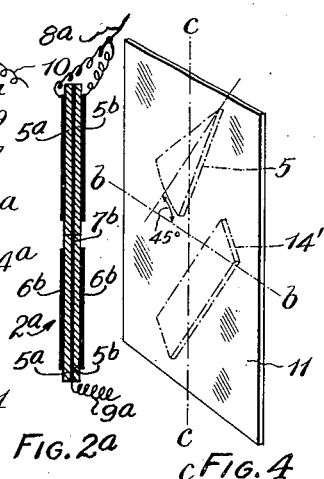
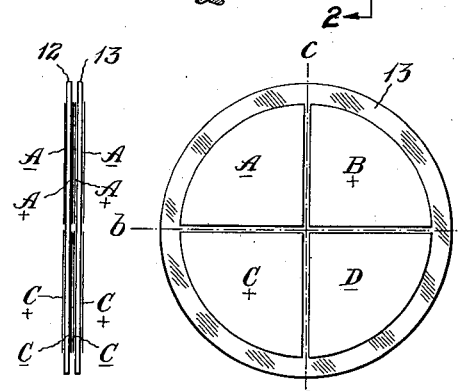
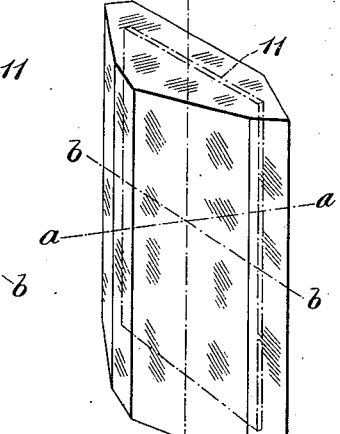
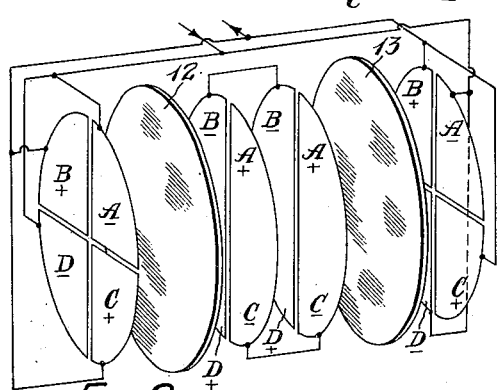
INVENTOR:
Charles Baldwin Sawyer
BY
ATTORNEY Jan. 11, 1938.    C. B. SAWYER    2,105,010
PIEZOELECTRIC DEVICE
Filed Feb. 25, 1933    2 Sheets-Sheet 2
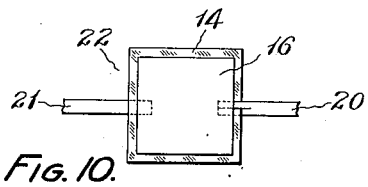
FIG. 10.
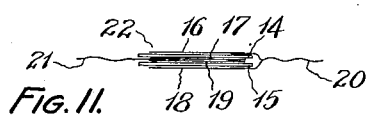
FIG. 11.
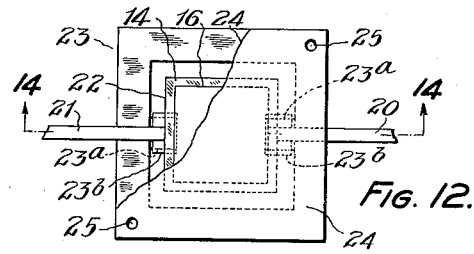
FIG. 12.
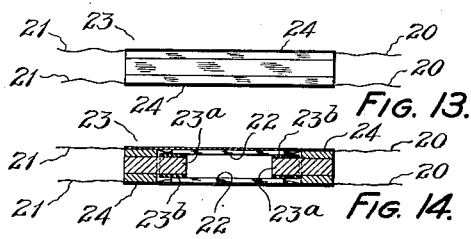
FIG. 13.
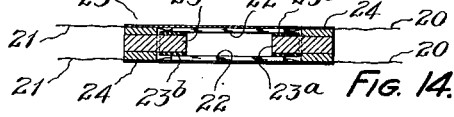
FIG. 14.
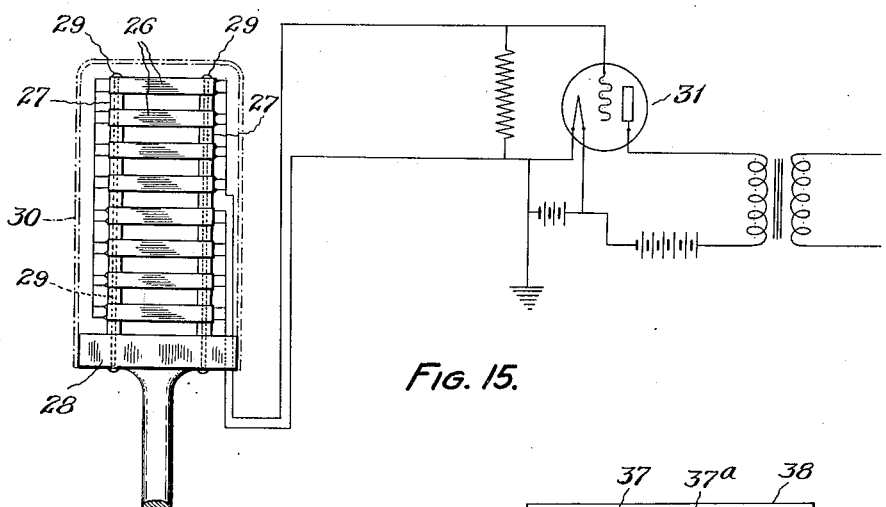
FIG. 15.
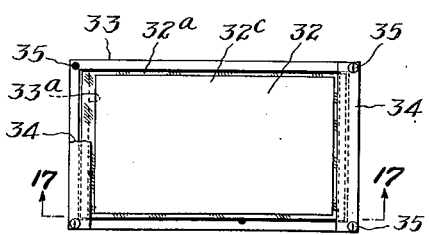
FIG. 16.
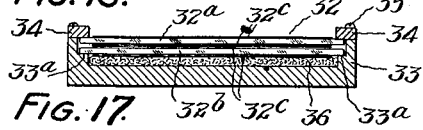
FIG. 17.
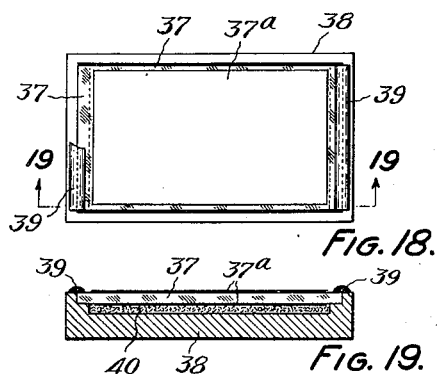
FIG. 18.
FIG. 19.
INVENTOR:
Charles Baldwin Sawyer
BY Ray S. Fehr
ATTORNEY Patented Jan. 11, 1938

2,105,010

UNITED STATES PATENT OFFICE 2,105,010

PIEZOELECTRIC DEVICE

Charles Baldwin Sawyer, Cleveland, Ohio, assignor to The Brush Development Company, Cleveland, Ohio, a corporation of Ohio Application February 25, 1933, Serial No. 658,649

12 Claims. (Cl. 179—110)

The invention relates to improved apparatus for the effective conversion of mechanical impulses of a fluid medium into corresponding electrical impulses and for the similar conversion of electrical impulses into mechanical impulses of a fluid medium. The invention contemplates the use of piezo-electric devices to these ends.

Some of the main objects of the invention are comprised in the accomplishment of the desired conversion of energy by the use of piezo-electric apparatus that is simple and rugged in construction, reliable in operation, and sufficiently sensitive to faithfully convert the one form of energy to the other.

The invention is based upon the discovery that if a piezo-electric body of suitable material, such as Rochelle salt crystal, is made sufficiently thin in relation to its other dimensions and suitably oriented in relation to its crystalling axes and is suitably supported and shielded in a fluid medium, mechanical impulses of that medium, acting directly on the body, will flex it and set up molecular stresses in it that generate sufficiently great differences of potential upon the surfaces of the body to make it feasible to conduct therefrom practically useful electrical impulses faithfully corresponding to the mechanical impulses and, vice versa, electrical impulses applied to suitable surfaces of the piezo-electric body will cause a similar flexing thereof with a direct radiation from the body into the surrounding medium of corresponding mechanical impulses of useful magnitude. In my United States Letters Patent Reissue No. 20,213 I have disclosed piezo-electric bodies which flex in operation but they do not utilize in their operation the direct coaction with the surrounding medium which characterizes the present invention.

To give a clear understanding of the invention I will describe some of the different ways of carrying it out with reference to the accompanying drawings showing different forms of apparatus suitable for the purpose. In the drawings, Fig. 1 is a front elevation of a microphone or speaker embodying the invention.

Fig. 2 is a section on the line 2—2 of Fig. 1.

Fig. 2ᵃ is a sectional view of a piezo-electric disk or diaphragm of modified construction, the section of the figure corresponding to that of Fig. 2.

Fig. 3 is a perspective view of a Rochelle salt crystal with the crystalline axes indicated and showing by dot-and-dash lines the position in the crystal of a plate-like body which may be cut therefrom for the purposes of this invention.

Fig. 4 is a perspective view of such a plate cut from the crystal, with dot-and-dash lines indicating the position in the plate of pieces which may be cut therefrom for the uses of the invention.

Fig. 5 is another view of a plate such as that shown in Fig. 4 showing its relation to the crystalline axes b—b and c—c and indicating by dot-and-dash lines a circular disk which may be cut therefrom for use in a microphone such as that shown in Fig. 1.

Fig. 6 is a face view of a piezo-electric disk modified in construction in comparison with that shown in Fig. 1.

Fig. 7 is an edge view of the disk shown in Fig. 6, with the parts of the disk structure separated enough to disclose the construction.

Fig. 8 is an expanded view of the disk shown in Fig. 6 with one form of electrical connections indicated.

Fig. 9 is a view similar to Fig. 8 showing a modified form of foiling and electrical connections.

Fig. 10 is a plan view of a modified form of piezo-electric body designed to function by flexing in a manner previously referred to.

Fig. 11 is an edge view of the body shown in Fig. 10 with the parts separated enough to disclose the construction.

Fig. 12 is a plan view of a sound cell using a pair of piezo-electric bodies such as are shown in Figs. 10 and 11.

Fig. 13 is an edge view of the sound cell shown in Fig. 12.

Fig. 14 is a section on the line 14—14 of Fig. 12.

Fig. 15 is a side elevation of a microphone made up of a grid-like pile of the plurality of sound cells such as shown in Fig. 12, together with a diagram of one form of electrical connections that may be employed with such microphone.

Fig. 16 is a plan view of another form of piezo-electric device embodying the invention.

Fig. 17 is a section on the line 17—17 of Fig. 16.

Fig. 18 is a plan view similar to that of Fig. 16 showing a modification of the construction.

Fig. 19 is a section on the line 19—19 of Fig. 18.

Referring in detail to the several forms of construction illustrated, and first to that of Figs. 1 and 2, the microphone illustrated in those figures comprises a circular metallic support 1 in which is mounted a piezo-electric disk designated in its entirety by the numeral 2. The support 1 is recessed on one side to receive the disk and provide a supporting shoulder 3 against which the edge portion of the disk is secured by some suitable means, such as cement 4. The recess in the support 1 provides a space back of the disk in which is arranged a disk 4ª of felt or the like which may be charged with some suitable material, such as oil or vaseline for a purpose which will later be explained. A small aperture 1ª extends through the web portion of the support 1 and affords communication between the space occupied by the felt 4ª and the atmosphere surrounding the apparatus and serves to slowly equalize the pressures on the two sides of the crystal diaphragm under changing barometric conditions. The aperture 1ª is small enough so that the support 1 effectively shields the back side of the diaphragm from the more rapid vibratory changes in the atmospheric pressure to which the instrument is intended to respond.

The piezo-electric disk or body 2, in the construction illustrated, comprises twelve pairs of sector-shape plates or sheets 5, 5' of suitable piezo-electric material. The two sector-shape plates 5, 5' of each pair may be cemented together so that the two plates constitute a unit. On the outer and inner faces of the disk are cemented circular sheets 6 and 7 of metal foil, such as tinfoil, these sheets preferably being formed with apertures 6ª and 7ª at their centers. The tinfoil sheets 6 and 7 constitute the two electrodes of the disk and each foil may be thought of as made up of a plurality of electrodes each corresponding to one of the sector-shape units of the disk. Current may be conducted from the electrode 6 through a suitable conductor 8. The other electrode 7 is connected by a conductor 9 to the support 1 and to the latter a suitable lead 10 is connected.

The operation of the microphone is dependent upon the nature of the piezo-electric disk and the sector-shape units which compose it. The character of the disk will be understood from a consideration of the piezo-electric crystalline material employed. The Rochelle salt crystal shown in Fig. 3 has its transverse and longitudinal crystalline axes b—b and c—c in the same plane and its electrical axis a—a at right angles to the said plane. The crystalline plate 11 shown in Fig. 4 is cut from the crystal shown in Fig. 3 in the manner indicated by the dot-and-dash lines in Fig. 3 showing the position of the plate in the body of the crystal parallel to the b and c axes and at right angles to the a axis. The relation of the plate to the b and c axes is also indicated in Fig. 4. As is known, the molecular stresses in a Rochelle salt crystal which generate potential differences on the surfaces of the crystal upon expansion or contraction thereof, are in planes parallel to the b and c axes of the crystal and on lines at 45 degrees from each of said axes. Thus if we cut two sector-shape plates 5, 5' from the plate 11 in the manner indicated by dot-and-dash lines in Fig. 4 and, turning one plate over, superpose and cement it upon the other so that the top face of one is contiguous to the top face of the other, we have a piezo-electric element which will generate differences of potential upon its faces if the element is bent, since the two plates 5, 5' are in opposed electrostatic relationship and when the element is bent mutually constrain each other so that one of the plates is in tension and the other in compression. Conversely, if a potential difference is established between the two faces of one of the sector elements it will be bent by the effect of the electric charges on its surfaces. These phenomena are pointed out in my United States Letters Patent Reissue No. 20,213 mentioned above. A piezo-electric body, such as described, comprising two crystal plates with suitable electrodes and so oriented electrostatically and so constrained that upon flexing of the body a difference of potential is established at the electrodes, or vice versa, I term a "bimorph". Assembling twelve of these sector elements and cementing the tinfoil sheets thereto we secure the piezo-electric disk 2 of Figs. 1 and 2.

With this construction when the disk is flexed each sector generates electrical impulses at its electrodes and these may be conducted away by the conductors 8, 9 and 10. The considerations involved in the functioning of the sector-shape elements of the disk 2 is discussed in my patent above referred to which may be consulted for a more detailed explanation of the matter.

In the operation of the microphone, sound waves in the air exert a vibratory pressure on the exposed face of the disk 2 but are prevented by the support 1 from acting upon the inner face of the disk, with resultant vibratory movement of the disk and generation of corresponding electrical impulses on the surfaces of the disk which impulses may be conducted away over the conductors 8 and 10 and made use of in the usual or well known manner. In the operation of the device the oil saturated felt 4ª serves to damp the vibratory movement of the disk, as may be found desirable.

It will be understood that a device of this character may be used as a speaker in which event electrical impulses conducted over the conductors 8 and 10 to the electrodes 6 and 7 serve to vibrate the piezo-electric disk.

In Fig. 2ª is shown a piezo-electric disk or diaphragm 2ª of modified construction. This disk comprises an assembly of twelve plate-shaped sector elements. Sector plates 5ª and 5ᵇ of each element, which are of the same character as the plates 5, 5' in Figs. 1 and 2, are cemented together with the top face of one adjacent the bottom face of the other and with an electrode sheet 7ᵇ interposed between them. The sheet 7ᵇ may be a common inner electrode for all twelve pairs of plates and may be connected by conductor 9ª to the external circuit. Conductor 8ª connects the outer electrodes 6ᵇ, 6ᵇ together and to the external circuit. The common electrode sheet 7ᵇ serves, in conjunction with outer electrodes 6ᵇ, 6ᵇ and the cement with which they are secured to the disk, to prevent leakage of air past the contiguous edges of the adjacent sector elements.

While the piezo-electric disks of the microphone shown in Figs. 1, 2 and 2ª may be constructed as above described, in practice it is preferable to use the simpler form of construction illustrated in Figs. 6 and 7. This construction comprises two disks 12 and 13 each of which has sector-shaped foils A, B, C and D cemented on their outer and inner faces, the two foiled disks thus constituted being in turn cemented together to form the circular plate-like piezo-electric body. In making this disk, two crystalline plates, such as the plate 11 shown in Fig. 4, are used. One such plate is shown in Fig. 5 which also shows the relation of the crystalline axes b—b and c—c to the plate and the two molecular stress axes at 45 degrees to the crystalline axes and at right angles to each other. The stress axes are indicated by arrows, those of one axis being pointed radially outward and those of the other axis radially inward to indicate the directions of the simultaneous stresses set up in the piezo-electric material when differences of potential are established on the faces of the plate 11. For the construction of Figs. 6 and 7 the plates 11 are to be arranged with the bottom face of one adjacent the top face of the other. Then, the quadrant electrodes having been applied to the plates 11 in the relation to the crystalline axes indicated in Fig. 6, and the two plates 11 having been cemented together, the resultant structure is turned down to circular form, giving the disk shape shown in Fig. 6. Such a disk is in effect made up of four sectors of the same general character as the sectors of the first described disk, though the sectors of each plate are not separate from each other.

A disk of this character may be electrically connected in different ways, that is, the four sector-shape elements of the disk may be connected in series, series parallel, or parallel, depending on the electrical characteristics desired. In the expanded view shown in Fig. 8 the sectors are connected in parallel.

Fig. 9 is a similar expanded view showing a series-parallel connection. In this case the inner electrodes A and C are connected together by being made integral and the same is true of the inner electrodes B and D. In the drawings the polarity of the sector-shape electrodes A, B, C and D, for one direction of deflection of the disc, is indicated by plus and minus signs.

Another application of the invention is shown in Figs. 10 to 15, inclusive. Here the flexing piezo-electric body, as shown in Figs. 10 and 11, is a bimorph made up of two plate-like elements 14 and 15, the plate 14 having metal foil electrodes 16 and 17 cemented on its outer and inner faces, respectively, and the plate 15 having electrodes 18 and 19 cemented on its outer and inner faces, respectively. The two plates thus foiled are cemented together and leads 20 and 21 are brought out from the outer and inner electrodes, respectively. The piezo-electric body thus formed I designate in its entirety by the numeral 22. The plates 14 and 15 are cut from a crystal plate, such as the plate 11 of Figs. 3 and 4, in such a manner that their sides are disposed at 45 degrees to the $b$ and $c$ axes of the crystal. In Fig. 4 the rectangular outline 14', shown by dotted lines, indicates the 45-degree relation of the plates to the crystal. In Figs. 12, 13 and 14 is illustrated a sound cell in which two of the bodies 22 are mounted in parallel spaced relation in a frame-like support designated in its entirety by 23. This frame-like support is preferably formed of a material such as "Bakelite" and is provided with two inwardly projecting lugs 23$^a$, 23$^a$ for the support of the piezo-electric bodies 22, 22. The frame can conveniently be formed in three parts, as shown in Fig. 14, by stamping the parts from sheet material, the middle part being formed with the lugs 23$^a$. Each lug is covered with a rubber cushion 23$^b$ so that the piezo-electric body will be supported without injury. The two piezo-electric bodies are secured in position by sheets 24, 24 of suitable material, such as thin paper, which are cemented to the faces of the piezo-electric bodies and to the top and bottom faces of the frame or support 23 so as to prevent passage of air past the edges of the bodies 22 and also aid the frame 23 in supporting said bodies. Each support is provided with two or more perforations 25, 25 through which supporting wires or rods may be passed.

In the operation of the sound cell shown in Figs. 12, 13 and 14 sound waves or other mechanical impulses in the surrounding medium exert vibratory pressure on the outer faces of the cell but are prevented from acting on the inner faces thereof and thus cause flexing of the bimorph bodies with resultant generation of electromotive forces at their electrodes and such electromotive forces may be conducted away to actuate loud speakers or to perform other functions. Similarly, the cell may operate as a radiator of sound waves if varying potential differences are established at its electrodes by conducting electric impulses thereto. In the operation of the sound cell in either of these two ways the paper diaphragms overlying and cemented to the bimorphs serve to extend the effective surfaces of the latter to some extent, as will readily be understood.

A single sound cell such as is shown in Figs. 12, 13 and 14 can be used as a microphone or as a speaker even when made very small in size. In fact, in practice the piezo-electric body 22 used in constructing the sound cell may be made as small as $\tfrac{7}{32}''$ x $\tfrac{7}{32}''$ and with a thickness of only .011". The cell thus may be worn as a microphone upon the lapel of a person's coat. However, it is advantageous to use a plurality of the sound cells in a microphone of the character shown in Fig. 15. Here a plurality of such sound cells 26, 26 are arranged grid fashion one above the other with intervening spaces provided by spacing blocks 27, 27, the entire structure being secured to a suitable stand or base 28 by means of slender rods 29, 29 which pass through the base, the cells 26 and the spacing blocks 27.

A suitable foraminous protecting case 30, indicated by dot-and-dash lines, may be secured to the standard 28. The individual sound cells of the microphone thus provided and the individual bimorph elements of the sound cells may be electrically interconnected in various ways to match the impedance of the electric circuit in which the microphone is connected. In Fig. 15 a series-parallel connection is shown, the four upper cells 26 being connected in parallel with each other and the four lower cells being similarly connected while the two groups of cells are connected in series. The two bimorph elements in each cell are shown connected in parallel but obviously could, where desired, be connected in series. A piezo-electric device such as is shown in Fig. 15 may be used either as a microphone or as a speaker. When used as a microphone, it may of course be connected into electrical circuits in various known ways. By way of example, Fig. 15 shows the instrument connected with a thermionic amplifier which is designated as an entirety by 31 and which is of known construction.

By reason of its peculiar construction the piezoelectric instrument shown in Figs. 10 to 15 is remarkably insensitive in operation to mechanical shock or vibratory or other sudden movements of the instrument. This is due to the fact that flexing of the piezo-electric elements due to their inertia when the instrument as a whole is suddenly moved, generates impulses which are opposed to each other and substantially cancel each other. This will better be understood on reference to Figs. 12 and 14. It will be seen that in the normal operation of one of the sound cells the surrounding medium acting upon the sides of the cell causes the bimorph bodies to flex simultaneously inward toward each other and simultaneously outward away from each other under the vibratory impulses of the fluid medium; and by reason of the electrical connections of the two piezo-electric bodies the impulses simultaneously generated by them are additively combined. On the other hand, if the sound cell is suddenly bodily moved in a direction having a substantial component normal to the faces of the sound cell, the inertia of the piezo-electric bodies will cause them to flex more or less but in the same direction, so that the electric impulses generated by such flexing are substractively combined and substantially cancel each other. Sudden bodily movements of the sound cell in a direction parallel to the faces of the cell obviously will not cause flexing of the latter.

The principle upon which is based the last described feature of the instrument shown in Figs. 10 to 15 is applicable to instruments other than those operating upon the piezo-electric principle.

In Figs. 16 and 17 I have shown another application of the invention in which a bimorph 32 is mounted in a shielding case 33. The case is recessed and formed with supporting shoulders 33ª for the bimorph which is retained between these shoulders and strips 34 which are secured to the body of the case by screws 35. In the space back of the bimorph is arranged a sheet of felt or the like 36 which may be charged with oil or vaseline and which may serve to damp the vibrations of the bimorph. The bimorph in this case is formed of two plates 32ª, 32ᵇ of Rochelle salt crystal which may be cut from the plate 11 of Fig. 4 as shown by the rectangle 14' of dot-and-dash lines in that figure. Each of the two plates has foil electrodes 32ᶜ cemented to its opposite faces and the two elements thus formed are cemented together to form the bimorph assembly in the manner previously described. The two outer electrodes of the bimorph constitute one terminal and the inner electrodes the other terminal of the device which can be used either as a microphone or as a speaker. Suitable conductors (not shown) connected to the inner and outer electrodes, respectively, may be provided.

The operation of the form of apparatus shown in Figs. 16 and 17 will readily be understood from the preceding descriptions of the other forms of apparatus. Sound waves or other mechanical impulses of the medium surrounding the device act to flex the bimorph piezo-electric body with resultant generation of electrical impulses at the electrode surfaces of the bimorph and these impulses may be conducted away by suitable electrical connections. Similarly, the device may serve as a radiator of mechanical impulses when varying electromotive forces are established at the electrode surfaces of the bimorph.

In carrying out my invention the flexing piezo-electric body employed need not necessarily consist of a bimorph. A single plate of piezo-electric material can be employed if the plate is suitably constrained by its mechanical mounting. In Figs. 18 and 19 I have shown an apparatus of the same general character as that shown in Figs. 16 and 17 but with such a single piezo-electric plate substituted for the bimorph shown in the former figures. In this modified construction the piezo-electric body consists of a single piezo-electric plate 37 which is mounted in a case 38 with its end edges anchored in the case and its side edges free to move in relation to the case. The plate 37 is of the same character as the crystal plates of the bimorph 32 in Figs. 16 and 17 and is provided with metal foil electrodes 37ª on its two faces as indicated. The ends of the plate 37 can be anchored in a variety of ways but in the construction shown this is accomplished by making the plate of such a length that it has a tight fit endwise in the case and is further secured by cement 39, 39. Preferably the plate is forced into the case so as to give the plate some mechanical bias. 40 is an oil-charged felt which serves to damp the movement of the plate 37. In this instance the two electrodes 37ª constitute the two terminals of the device and suitable electric leads (not shown) may be connected with these electrodes.

From a consideration of the crystalline orientation of the plate 37 it will be seen that the flexing of the plate by mechanical impulses picked up from the air or other surrounding medium varies the compressive stresses induced in the plate by its mechanical bias or constraint and that this results in the generation of electrical impulses at the electrode surfaces of the plate. And conversely, if potential differences are set up at the electrode surfaces of the plate the latter is flexed so that the device functions as a speaker or a radiator of mechanical impulses.

The last described form of apparatus functions as a receiver or radiator of mechanical impulses in the same general manner as the device shown in Fig. 16 and its operation will be understood without further description.

From a consideration of the different devices which are shown in the drawings and above described it will be apparent that considerable variation is possible in the electrodes of the crystalline plates. Thus in the device shown in Figs. 1 and 2 no internal electrodes are provided between the crystal plates while in the other multiple plate devices shown and described such internal electrodes are provided. Furthermore the internal electrodes may, as in Figs. 2ª and 8, be connected to the external circuit or may not be so connected, as in Fig. 9. In any one of the multiple plate devices shown and described use may be made of any one of the several electrode arrangements illustrated, care being exercised, of course, to see that there is a suitable orientation of the crystal plates, one relative orientation of the two crystalline plates being suitable if there are mutually connected internal electrodes connected to the external circuit and another orientation of the plates being suitable if such internal electrodes are not connected to the external circuit or if there are no internal electrodes used. It will be observed that if the bimorph has internal electrodes which are connected into the exterior circuit, the capacities of the two crystalline plates are in parallel whereas if the bimorph does not have internal electrodes or has such electrodes not connected to the external circuit, the capacities of the two plates are in series.

From the foregoing description of the several forms of apparatus disclosed it will be seen that I have provided apparatus for converting mechanical impulses into electrical impulses, and vice versa, which involves essentially direct interaction between a fluid medium and the surfaces of flexing plate-like piezo-electric bodies which preferably have surface dimensions relatively great in proportion to their thickness so that they are adapted to be flexed by the direct action of mechanical impulses of the surrounding fluid medium upon their surfaces with the resultant generation at the electrodes contiguous to said surfaces of electrical impulses that faithfully correspond to the said mechanical impulses, the plate-like bodies also being adapted to be similarly flexed by the application of electrical impulses to the electrodes. Each of the several forms of apparatus illustrated operates upon this principle.

The use of a flexing piezo-electric body either for receiving mechanical impulses directly from a surrounding fluid medium or for transmitting such impulses directly to such medium is advantageously carried out, as in the cases of the constructions illustrated, by provision for the shielding of one side of the plate-like piezo-electric body. However, under some conditions and for some purposes useful results can be secured with little or no shielding. With respect to the shielding effects provided in the specific forms of construction illustrated in the drawings, it is observed that in the case of the sound cells illustrated in Figs. 10 to 15 each of the two bimorph bodies serves (in conjunction with the supporting structure) to shield the other.

Numerous advantages attach to my improved apparatus. Thus such apparatus is characterized by remarkable sensitiveness due to the fact that the mechanical vibrations of the surrounding medium act directly upon the body to be flexed and the plate-like elements of the body are so arranged that a very small force producing flexure results in a large stress and strain in the piezo-electric material at right angles to the said force.

Again, my improved apparatus is capable of handling a wide range of forces and frequencies. A very small force will produce a deflection sufficient to provide a workable value of electromotive force, owing to the thinness and flexibility of the structure, but a force many thousand times larger will not overload or damage the apparatus, as, owing to the thinness and flexibility of the piezo-electric elements they are able to bend a comparatively large distance without permanent deformation or damage. As to the range of frequencies, the dimensions of the elements may be very much reduced in all directions, while still retaining abundant sensitivity. Such elements may therefore be designed for a wide range of natural periods, with response characteristics, either alone or in combination, to suit diverse specifications.

By employing the preferred forms of my apparatus, as herein disclosed, the direct radiation into or absorption from a fluid medium of acoustic vibrations is effected substantially non-selectively over a wide band of frequencies. That is to say, the response over this band is substantially independent of the frequency. Such effective interchange of acoustic energy between the crystal and surrounding medium over a frequency range of one octave represents a distinctly useful achievement, as, for example, in the case of a supplementary high frequency speaker having a frequency range of 4,000 to 8,000 cycles per second, but the range which I actually attain may, in fact, reach a considerable number of octaves, as in the case of a microphone having a range from 30 to 14,000 cycles per second.

The direct interaction between the flexing piezo-electric body and the surrounding fluid medium characteristic of my invention results in various noticeable advantages incident to the elimination of mechanical parts such as characterize prior apparatus of this class known to me. Thus the elimination of the mechanical diaphragm of prior apparatus removes the distortion due to inherent resonance periods in the diaphragm and the elimination of mechanical connections or transmitting means between the diaphragm and the transmitting element removes another source of distortion. Obviously the elimination of these mechanical parts results in great structural simplification and a corresponding reduction in cost of production.

Again, the small size of the piezo-electric body obtainable by the use of the flexing principle renders this type of apparatus adaptable to many forms and varieties of construction where space limitations are controlling. Furthermore, the small dimensions of the piezo-electric body and the correspondingly small size of a receiving or transmitting instrument makes the latter superior acoustically because of the corresponding minimizing of the distortion of the sound field.

In my apparatus the only moving part is the flexing member or diaphragm and hence this is the only part that ever needs mechanical damping and the damping when desired may readily be provided by the designer.

From a mere inspection of the forms of apparatus disclosed the simplicity and ruggedness of the apparatus will be readily apparent. There are no extraneous moving parts and the whole is so light and self-contained that it will withstand comparatively severe shocks. Furthermore, no external electrical or magnetic fields are necessary since the equivalent of these is provided by the crystal itself. Furthermore, a minimum of apparatus is necessary in the electric circuit connected to my improved form of instrument since the fact that the Rochelle salt plates may be made very thin coupled with the inherently high specific inductive capacity of the Rochelle salt itself permits the attainment of a comparatively high value of electric capacity between the electrodes of each section and such sections can be combined in series or parallel so as to provide a resultant capacity of the instrument which most nearly matches the available capacity of the electric circuit, thus requiring a minimum of apparatus such as step-down or step-up transformers, etc. to match the instrument most efficiently to the electrical characteristics of the circuits available.

From what has been said it will be apparent that a great variety of forms of apparatus may be used in the practice of the invention, the scope of the invention being indicated by the appended claims.

What I claim is:

1. In piezo-electric apparatus, the combination of a plurality of plate-like piezo-electric bodies adapted by flexing to convert electrical impulses into mechanical impulses, and vice versa, and means for operatively supporting said bodies in spaced relation to each other with a space between their mutually facing surfaces substantially enclosed by them and the supporting means.

2. In piezo-electric apparatus, the combination of a pair of plate-like piezo-electric bodies adapted by flexing to convert electrical impulses into mechanical impulses, and vice versa, and means for operatively supporting said bodies with their planes in substantially parallel spaced relation with the space between their mutually facing surfaces substantially enclosed by them and the supporting means.

3. In piezo-electric apparatus, the combination of a plurality of sound cells each comprising a pair of plate-like piezo-electric bodies adapted by flexing to convert electrical impulses into mechanical impulses, and vice versa, means for operatively supporting said bodies opposite each other with their planes in substantially parallel spaced relation, and means joining the edge portions of said plate-like bodies and serving to close substantially tightly the space between them; means for supporting said cells one above another with intervening spaces between them; and means for electrically connecting the electrode surfaces of the cells.

4. In piezo-electric apparatus, the combination of a plurality of sound cells each comprising a pair of plate-like piezo-electric bodies adapted by flexing to convert electrical impulses into mechanical impulses, and vice versa, means for operatively supporting said bodies opposite each other with their planes in substantially parallel spaced relation, and means joining the edge portions of said plate-like bodies and serving to close substantially tightly the space between them; means for supporting said cells one above another with intervening spaces between them and with their peripheries substantially aligned with each other; and means for electrically connecting the electrode surfaces of the cells.

5. In piezo-electric apparatus, the combination of a plurality of plate-like piezo-electric bodies adapted by flexing to convert electrical impulses into mechanical impulses, and vice versa, and means for operatively supporting said bodies in spaced relation to each other with a space substantially enclosed by them and the supporting means.

6. In a transducer a flat assembly comprising a plurality of piezoelectrically active plate-shaped elements arranged in edge alinement and with corners of said elements substantially meeting at a common central point of said assembly, each of said elements comprising a pair of superposed crystal plates having an electrode between their adjacent faces and electrodes on their outer faces, and circuit connections between the several electrodes of said elements, and means at the contiguous edges of said elements to prevent leakage of air past said contiguous edges.

7. In a transducer, a piezo-electric diaphragm comprising in combination a pair of superposed layers of Rochelle salt crystalline material connected together at their mutually adjacent faces and formed with said faces substantially parallel to the major crystalline axes of said material; a plurality of groups of electrodes for the diaphragm, the electrodes of each group being disposed in substantial edge alignment with each other and with an electrode adjacent each of the two faces of the diaphragm and the several groups of electrodes being disposed with their median lines in different angular positions and intersecting the axis of the diaphragm; and circuit connections between the electrodes; the major crystalline axes of the respective layers of the crystalline material between the electrodes of each group being disposed substantially at 45 degrees to the median line of the group and the electrodes being so connected by the said circuit connections that the application of an electromotive force to the circuit will establish electrostatic fields of proper directions in the said layers of the diaphragm to cause the crystalline material between the electrodes of each group simultaneously to expand in one layer and contract in the other layer on lines parallel to the median line of the group.

8. In a transducer, a piezo-electric diaphragm substantially impervious to air comprising in combination a pair of superposed layers of Rochelle salt crystalline material connected together at their mutually adjacent faces and formed with said faces substantially parallel to the major crystalline axes of said material; a plurality of groups of electrodes for the diaphragm, the electrodes of each group being disposed in substantial edge alignment with each other and with an electrode adjacent each of the two faces of the diaphragm and the several groups of electrodes being disposed with their median lines in different angular positions and intersecting the axis of the diaphragm; and circuit connections between the electrodes; the major crystalline axes of the respective layers of the crystalline material between the electrodes of each group being disposed substantially at 45 degrees to the median line of the group and the electrodes being so connected by the said circuit connections that the application of an electromotive force to the circuit will establish electrostatic fields of proper directions in the said layers of the diaphragm to cause the crystalline material between the electrodes of each group simultaneously to expand in one layer and contract in the other layer on lines parallel to the median line of the group.

9. In a transducer, a piezo-electric diaphragm comprising in combination a pair of superposed layers of Rochelle salt crystalline material connected together at their mutually adjacent faces and formed with said faces substantially parallel to the major crystalline axes of said material; a plurality of groups of electrodes for the diaphragm, each group having three electrodes with one of them disposed between the said layers and the remaining two electrodes disposed adjacent to the two faces, respectively, of said diaphragm and in substantial edge alignment with the inner electrode and the several groups of electrodes being disposed with their median lines in different angular positions and intersecting the axis of the diaphragm; and circuit connections between the electrodes; the major crystalline axes of the respective layers of the crystalline material between the electrodes of each group being disposed substantially at 45 degrees to the median line of the group and the electrodes being so connected by the said circuit connections that the application of an electromotive force to the circuit will establish electrostatic fields of proper directions in the said layers of the diaphragm to cause the crystalline material between the electrodes of each group simultaneously to expand in one layer and contract in the other layer on lines parallel to the median line of the group.

10. In a transducer, a piezo-electric diaphragm substantially impervious to air comprising in combination a pair of superposed layers of Rochelle salt crystalline material connected together at their mutually adjacent faces and formed with said faces substantially parallel to the major crystalline axes of said material; a plurality of groups of electrodes for the diaphragm, each group having three electrodes with one of them disposed between the said layers and the remaining two electrodes disposed adjacent to the two faces, respectively, of said diaphragm and in substantial edge alignment with the inner electrode and the several groups of electrodes being disposed with their median lines in different angular positions and intersecting the axis of the diaphragm; and circuit connections between the electrodes; the major crystalline axes of the respective layers of the crystalline material between the electrodes of each group being disposed substantially at 45 degrees to the median line of the group and the electrodes being so connected by the said circuit connections that the application of an electromotive force to the circuit will establish electrostatic fields of proper directions in the said layers of the diaphragm to cause the crystalline material between the electrodes of each group simultaneously to expand in one layer and contract in the other layer on lines parallel to the median line of the group.

11. In piezo-electric apparatus, the combination of a plurality of plate-like piezo-electric bodies each adapted by flexing to convert electrical impulses into mechanical impulses, and vice versa; means for spacing said bodies apart from each other; and means connecting the edges of said bodies and serving in conjunction with said bodies to enclose a space between the bodies.

12. In piezo-electric apparatus, the combination of a pair of plate-like piezo-electric bodies each adapted by flexing to convert electrical impulses into mechanical impulses, and vice versa; means for spacing said bodies apart from each other in face to face relation; and means connecting the edges of said bodies and serving in conjunction with said bodies to enclose the space between the bodies.

CHARLES BALDWIN SAWYER.